US011592040B2

United States Patent
Zeman

(10) Patent No.: US 11,592,040 B2
(45) Date of Patent: Feb. 28, 2023

(54) COMPRESSED-AIR TREATMENT SYSTEM AND METHOD FOR OPERATING A COMPRESSED-AIR TREATMENT SYSTEM

(71) Applicant: KNORR-BREMSE Systeme fuer Nutzfahrzeuge GmbH, Munich (DE)

(72) Inventor: Ferenc Zeman, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/284,314

(22) PCT Filed: Sep. 23, 2019

(86) PCT No.: PCT/EP2019/075571
§ 371 (c)(1),
(2) Date: Apr. 9, 2021

(87) PCT Pub. No.: WO2020/074245
PCT Pub. Date: Apr. 16, 2020

(65) Prior Publication Data
US 2021/0404490 A1 Dec. 30, 2021

(30) Foreign Application Priority Data
Oct. 11, 2018 (DE) ...................... 10 2018 217 405.9

(51) Int. Cl.
*F15B 21/00* (2006.01)
*F15B 21/048* (2019.01)
(Continued)

(52) U.S. Cl.
CPC .......... *F15B 21/005* (2013.01); *B60T 17/004* (2013.01); *F15B 13/024* (2013.01);
(Continued)

(58) Field of Classification Search
CPC ..... B60T 17/004; F15B 21/005; F15B 21/048
See application file for complete search history.

(56) References Cited

U.S. PATENT DOCUMENTS 9,783,019 B2 * 10/2017 Diekmeyer ........... F15B 11/162
2010/0065129 A1 3/2010 Schnittger et al.
(Continued)

FOREIGN PATENT DOCUMENTS

CN 104968545 A 10/2015
CN 106470855 A 3/2017
(Continued)

OTHER PUBLICATIONS

International Search Report (PCT/ISA/210) issued in PCT Application No. PCT/EP2019/075571 dated Jan. 20, 2020 with English translation (six (6) pages).
(Continued)

*Primary Examiner* — Kenneth Bomberg
*Assistant Examiner* — Matthew Wiblin
(74) *Attorney, Agent, or Firm* — Crowell & Moring LLP

(57) ABSTRACT

A compressed-air treatment system and operating method are disclosed. The compressed-air treatment system has a first valve unit configured to charge a control line for a compressor with pressure and a pressure regulator valve unit configured to release pressure from a feed line, A control port of the pressure regulator valve unit is connectable to a second valve unit. A regeneration line which has a check valve for regeneration and which is utilized for a regeneration of a dryer cartridge is connected directly to the control line. During a filling operation the compressed-air treatment system is configured to release leakage air of the regeneration check valve via the first valve unit to surroundings. The filling operation is an operating state in which the compressor is activated to perform a supply of compressed air to a vehicle compressed-air system.

6 Claims, 2 Drawing Sheets

(51) Int. Cl.
*B60T 17/00* (2006.01)
*F15B 13/02* (2006.01)

(52) U.S. Cl.
CPC .......... *F15B 13/027* (2013.01); *F15B 21/048* (2013.01); *F15B 2211/30505* (2013.01); *F15B 2211/88* (2013.01)

(56) References Cited

U.S. PATENT DOCUMENTS

| | | | |
|---|---|---|---|
| 2010/0071779 A1 | 3/2010 | Bordács | |
| 2012/0325327 A1 | 12/2012 | Eggebrecht et al. | |
| 2015/0224438 A1* | 8/2015 | Brinkmann | B01D 53/0454 95/21 |
| 2018/0126972 A1* | 5/2018 | Bozsik | B60T 13/683 |
| 2021/0093991 A1* | 4/2021 | Schnittger | F15B 21/048 |

FOREIGN PATENT DOCUMENTS

| | | |
|---|---|---|
| DE | 10 2007 009 768 A1 | 8/2008 |
| DE | 10 2007 013 671 A1 | 9/2008 |
| DE | 10 2010 018 949 A1 | 11/2011 |
| DE | 10 2010 054 063 A1 | 6/2012 |
| EP | 2 140 926 A2 | 1/2010 |
| EP | 2 140 926 B1 | 10/2012 |
| EP | 2 719 595 B1 | 6/2015 |

OTHER PUBLICATIONS

German-language Written Opinion (PCT/ISA/237) issued in PCT Application No. PCT/EP2019/075571 dated Jan. 20, 2020 (nine (9) pages).
German-language Office Action issued in German Application No. 10 2018 217 405.9 dated Sep. 29, 2019 (six (6) pages).
International Preliminary Report on Patentability (PCT/IB/326 & PCT/IB/373) issued in PCT Application No. PCT/EP2019/075571 dated Apr. 22, 2021, including document C2 (Written Opinion (PCT/ISA/237) previously filed on Apr. 9, 2021) (10 pages).
Chinese First Office Action issued in corresponding Chinese Application No. 201980066669.1 dated Dec. 2, 2022 with English translation (13 pages).

* cited by examiner

COMPRESSED-AIR TREATMENT SYSTEM AND METHOD FOR OPERATING A COMPRESSED-AIR TREATMENT SYSTEM

BACKGROUND AND SUMMARY OF THE INVENTION

The invention relates to a compressed-air treatment system and a method for operating the compressed-air treatment system, in particular a compressed-air treatment system and a method for operating the compressed-air treatment system which prevent a supply line from having to open after each load cycle.

Compressed-air treatment systems are known in the art which treat compressed air for a vehicle compressed air system which has compressed air brakes or other actuators operated by compressed air. The vehicle compressed air system, or a part thereof, is opened after a corresponding load cycle, so that the compressed air escapes into the surrounding area. This leads to increased energy consumption when the vehicle compressed air system is refilled.

For this reason, it was desirable for the vehicle compressed-air system with the compressed-air treatment system to be designed in such a manner that the vehicle compressed air system is not opened after each load cycle. Publication EP 2 719 595 B1 discloses a compressed-air supply device and a method of operating the compressed-air supply device which provide this opportunity.

FIG. 2 shows a circuit diagram of a compressed-air treatment system according to the state of the art disclosed in publication EP 2 719 595 B1.

When a vehicle compressed air system is sufficiently filled, a compressor which is not shown is actuated via a compressor actuation opening 114 to produce no compressed air or, alternatively, when a pressure in the vehicle compressed air system is not sufficient, to produce compressed air which is then fed to the vehicle compressed air system via a supply line 124, a dryer cartridge 138, a check valve 146, and a supply line 148.

If a first valve unit 112 is then switched, the supply line 148 is connected to the compressor actuation opening 114 and a pressure signal is emitted to stop the compressor and relieve the compressed air system.

In order to regenerate the dryer cartridge 138, the air that has passed through the first valve unit 112 is conducted in addition to a second valve unit 118 which is then switched to produce a through-flow, so that a relief valve unit 122 is pneumatically actuated by the air conducted through the second valve unit 118, in order to open. In addition to the actuation air, the air conducted through the second valve unit 118 therefore flows via a check valve for regeneration 128 through the dryer cartridge 138, subsequently through the relief valve unit 122, and is then released via an outlet 144, in order to regenerate the dryer cartridge 138.

However, there is the risk of an unwanted leak occurring at the check valve for regeneration 128 during filling. This results in compressed air flowing from a line section downstream of the dryer cartridge 138 via the second valve unit 118, which is passable during filling, to reach the compressor actuation opening 114. However, actuation of the compressor is disrupted by this. Moreover, the leakage air may also flow to a control port 126 of the relief valve unit 122, so that said control port is switched to through-flow and air is released from the supply line 124 to the outlet 144.

The problem on which the invention is based is that of supplying a compressed-air treatment system and a method of operating the compressed-air treatment system which is unaffected by the above disadvantage and which allows there to be a reliable compressed air supply even when leaks occur.

The problem is solved by a compressed-air treatment system as claimed in claim 1 and a method as claimed in claim 6. Advantageous developments are the subject matter of the dependent claims.

According to an aspect of the invention, a compressed-air treatment system comprises a first valve unit which is designed to apply pressure to a control line for a compressor, and a pressure regulator valve unit which is designed to relieve pressure in a supply line, wherein a control port of the pressure regulator valve unit can be connected to a second valve unit, wherein a regeneration line which has a check valve for regeneration can be directly connected to the control line, and the compressed-air treatment system is designed to release leakage air to the surrounding area via the first valve unit from the check valve for regeneration during a filling operation. In this context directly means that although lines may be provided therebetween, there are no components that change, for example switch, an air flow, such as valves, for example.

By releasing the leakage air from the check valve for regeneration during filling operation, disruption of a compressor actuation by a leak at the check valve for regeneration is prevented.

In an advantageous development, the compressed-air treatment system comprises a supply line that can be connected to the compressor, an air dryer with a first air dryer port and a second air dryer port, wherein the first air dryer port can be connected to the supply line, a connection line that can be connected to the second air dryer port, a first check valve with a first check valve port and a second check valve port, wherein the first check port can be connected to the connection line, an outlet line that can be connected to the second check valve port, wherein the first check valve is designed to open when there is an air flow from the connection line via the first check valve to the outlet line. The first valve unit is designed to connect alternatively a first port of the first valve unit or a second port of the first valve unit to a third port of the first valve unit, wherein the first port of the first valve unit can be connected to the outlet line, the second port of the first valve unit can be connected to a surrounding area, and the third port of the first valve unit can be connected to the control line. The second valve unit is designed to open or close a connection from a first port of the second valve unit to a second port of the second valve unit. The pressure regulator valve unit is designed to open or close a connection from a first port of the pressure regulator valve unit to a second port of the pressure regulator valve unit. The first port of the second valve unit can be connected to the control line and the third port of the first valve unit and the second port of the second valve unit can be connected to a control port of the pressure regulator valve unit. The first port of the pressure regulator valve unit can be connected to the supply line and the second port of the pressure regulator valve unit can be connected to the surrounding area. The check valve for regeneration is provided with a first port and a second port, wherein the first port of the check valve for regeneration can be connected to the connection line. The second port of the check valve for regeneration can be connected to the third port of the first valve unit, wherein the check valve for regeneration is designed to open when there is an air flow from the third port of the first valve unit to the connection line.

This assembly of the compressed-air treatment system, in particular the connection of the second port of the check valve for regeneration to the third port of the first valve unit, means that any disruption of compressor actuation by a leak at the check valve for regeneration is prevented.

In the case of a compressed-air treatment system according to the prior art, the check valve for regeneration is connected via a non-actuated second valve unit to the compressor actuation opening, so that the leak in the check valve for regeneration has an effect on the actuation of the compressor. However, according to the present invention, the check valve for regeneration is connected to the third port of the first valve unit which is opened to the surrounding area when the first valve unit is not actuated. Therefore, air that escapes due to the leak through the check valve for regeneration can be released without further consequences and there is no effect on the compressor actuation or a release of compressed air.

According to an advantageous development, the compressed-air treatment system is designed to perform at least one of a filling operation in which air flows from the supply line through the air dryer, the connection line, and the first check valve to the outlet line, a power-saving operation in which air flows from the outlet line via the first valve element to the control line, and a regeneration operation in which air flows from the outlet line via the first valve unit and the second valve unit to the control port of the pressure regulator valve unit, as a result of which the first port of the third valve unit and the second port of the pressure regulator valve unit can be connected to one another, and the air flows into the surrounding area from the outlet line via the first valve unit and the check valve for regeneration via the connection line through the air dryer via the pressure regulator valve unit.

By implementing the filling operation, power-saving operation and regeneration operation as required, there is no need for the compressed air system to be opened after each load cycle. Consequently, a greater power consumption associated with this can be avoided.

According to further advantageous embodiments, the first valve unit has a 3/2-way valve and/or the second valve unit has a 2/2-way valve and/or the pressure regulator unit has a 2/2-way valve.

Since valves of this kind are available at a reasonable price and also have a compact design, the compressed-air treatment system can be constructed in a space-saving and economical manner.

According to a further aspect of the present invention, a method comprises at least one of an implementation of the filling operation, wherein the compressor is actuated to implement a compressed air supply, and the air is fed via the supply line, the air dryer, the connection line, the first check valve, and the outlet line to a vehicle compressed air system, an implementation of the power-saving operation, wherein the compressor is actuated to stop the compressed air supply while a pressure is maintained in the supply line, and an implementation of the regeneration operation, wherein the compressor is actuated to stop the compressed air supply and wherein the air flows from the outlet line via the first valve unit and the second valve unit to the control port of the pressure regulator valve unit, as a result of which the first port of the pressure regulator valve unit and the second port of the pressure regulator valve unit are connected to one another, and the air flows from the outlet line via the first valve unit and via the check valve for regeneration and via the connection line through the air dryer via the pressure regulator valve unit into the surrounding area.

By implementing the filling operation, the power-saving operation and the regeneration operation, there is no need for the compressed air system to be opened following each load cycle. Consequently, an increased power consumption produced by this can be prevented.

DETAILED DESCRIPTION OF THE DRAWINGS

Figure 1:
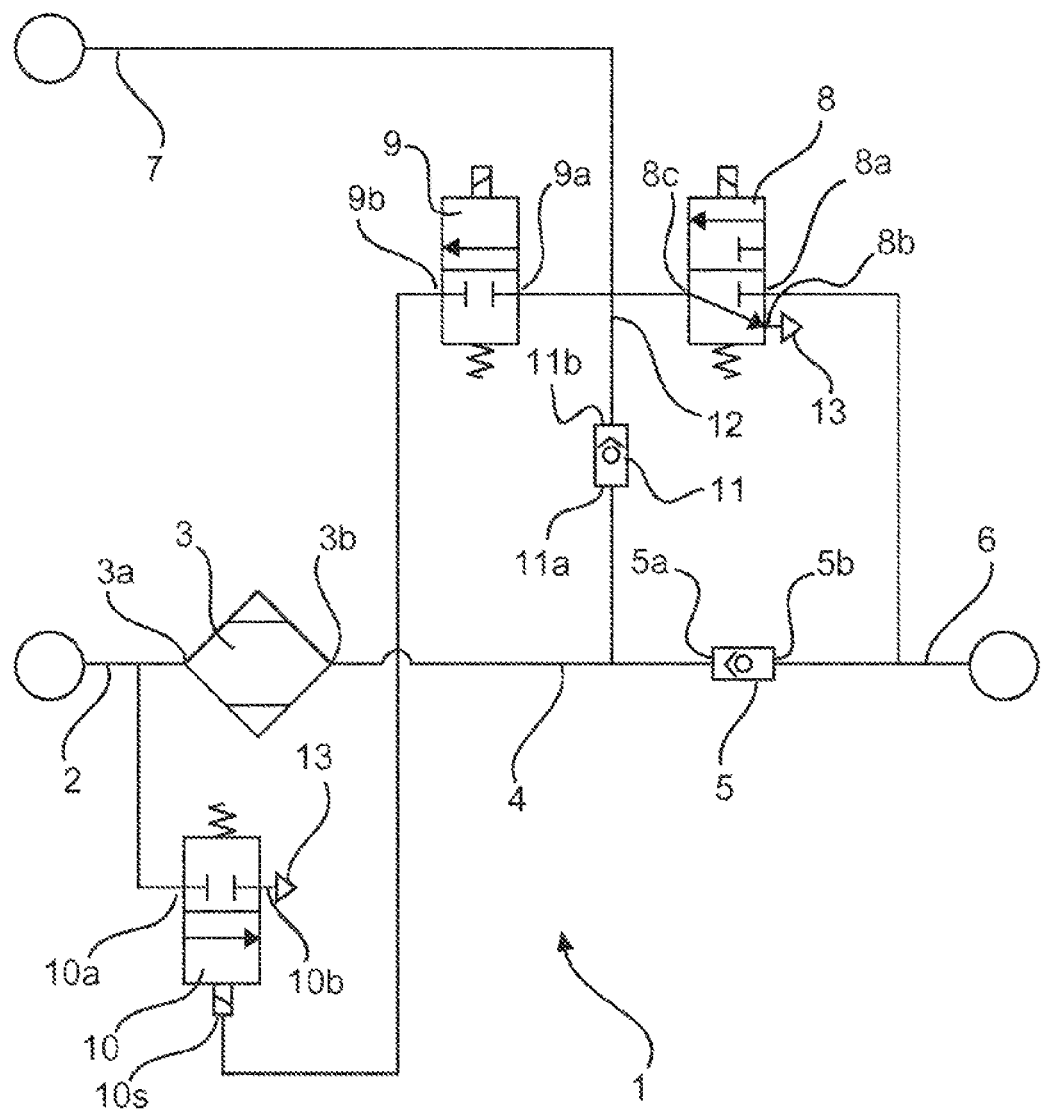
FIG. 1 shows a circuit diagram of a compressed-air treatment system according to and embodiment of the invention.
Figure 2:
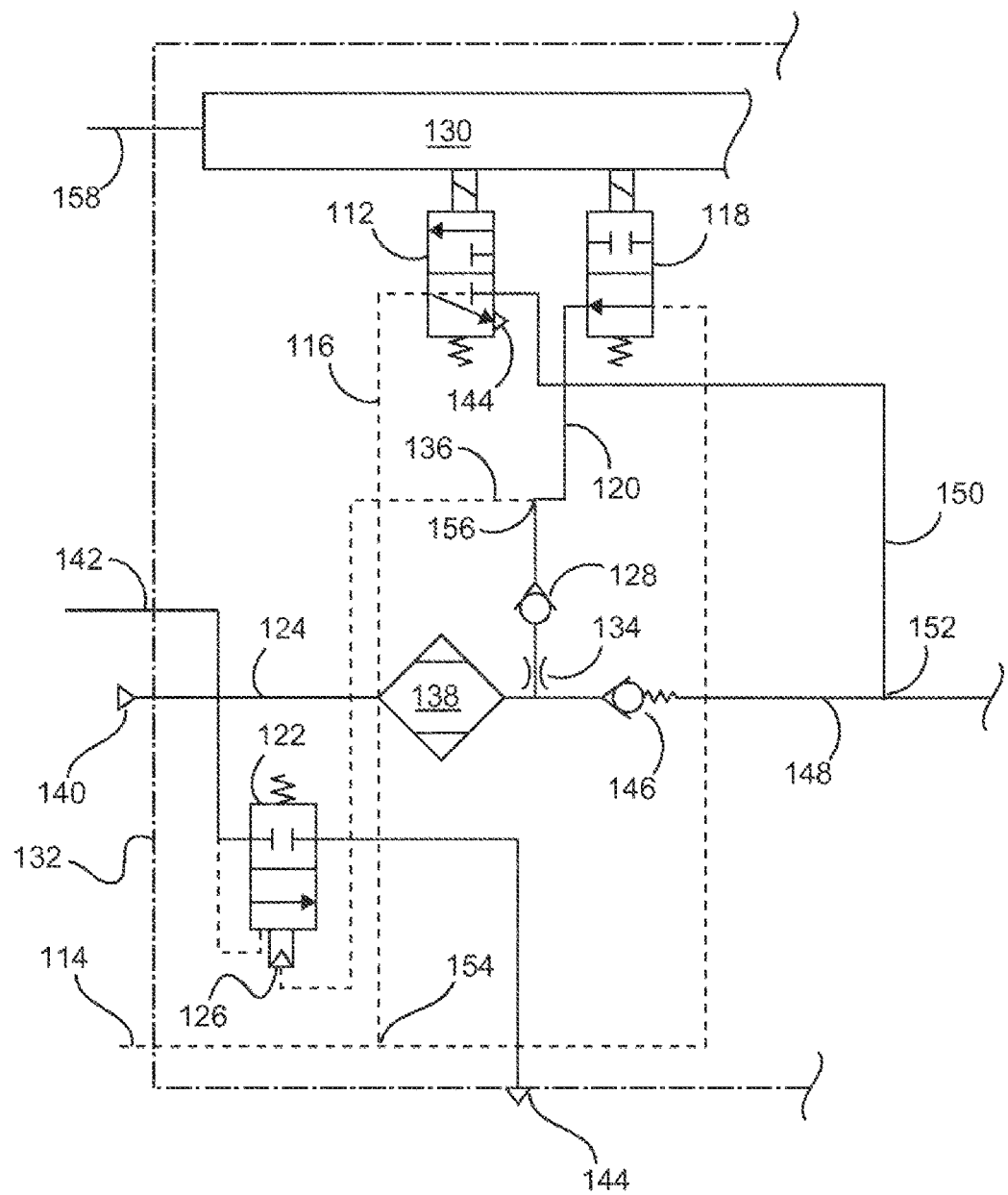
FIG. 2 shows a circuit diagram of a compressed-air treatment system according to the prior art.

FIG. 1 shows a circuit diagram of a compressed-air treatment system 1 according to an embodiment of the invention.

The compressed-air treatment system 1 comprises a supply line 2 connected to a compressor which is not shown. In addition, the compressed-air treatment system 1 comprises an air dryer 3 with a first air dryer port 3a and a second air dryer port 3b, wherein the first air dryer port 3a is connected to the supply line 2.

Moreover, the compressed-air treatment system 1 comprises a connection line 4 which is connected to the second air dryer port 3b.

Moreover, a first check valve 5 with a first check valve port 5a and a second check valve port 5b is provided, wherein the first check valve port 5a is connected to the connection line 4. The first check valve 5 opens when there is an air flow from the connection line 4 via the first check valve 5 to the outlet line 6.

Furthermore, an outlet line 6 which is connected to the second check valve port 5b is also provided.

Moreover, the compressed-air treatment system 1 has a control line 7 which is connected to the compressor, in order to control said compressor.

In the compressed-air treatment system 1, a first valve unit 8 is provided which alternatively connects a first port 8a of the first valve unit 8 or a second port 8b of the first valve unit 8 to a third port 8c of the first valve unit 8. The first port 8a of the first valve unit 8 is connected to the outlet line 6, the second port 8b of the first valve unit 8 is connected to a surrounding area 13, and the third port 8c of the first valve unit 8 is also connected to the control line 7. The connection to the surrounding area means that air can flow off into the surrounding area without any noticeable counter-pressure.

In addition, in the compressed-air treatment system 1, a second valve unit 9 which opens or closes a connection from a first port 9a of the second valve unit 9 to a second port 9b of the second valve unit 9, and a pressure regulator valve unit 10 which opens or closes a connection from a first port 10a of the pressure regulator valve unit 10 to a second port 10b of the pressure regulator valve unit 10 are provided.

The first port 9a of the second valve unit 9 is connected to the control line 7 and the third port 8c of the first valve unit 8 and the second port 9b of the second valve unit 9 is connected to a control port 10s of the pressure regulator valve unit 10. The first port 10a of the pressure regulator valve unit 10 is connected to the supply line and the second port 10b of the pressure regulator valve unit 10 is connected to the surrounding area 13.

Finally, a check valve for regeneration 11 with a first port 11a and a second port 11b is provided in a regeneration line 12, wherein the first port 11a of the check valve for regeneration 11 is connected to the connection line 4. The second port 11b of the check valve for regeneration 11 is connected to the third port 8c of the first valve unit 8. The check valve for regeneration 11 is open when there is an air flow from the third port 8c of the first valve unit 8 via the check valve for regeneration 11 to the connection line 4.

The first valve unit 8 has a single-acting 3/2-way valve which is switched by means of a solenoid from an unactuated state to an actuated state and is switched back into the unactuated state by means of a return spring. In the unactuated state, the second port 8b is switched through to the third port 8c and the first port 8a is blocked. In the actuated state, the first port 8a is switched through to the third port 8c and the second port 8b is blocked.

The second valve unit 9 has a single-acting 2/2-way valve which is switched electrically by means of a solenoid from an unactuated state to an actuated state and by means of a return spring back into the unactuated state. In the unactuated state, the first port 9a and the second port 9b are blocked. In the actuated state, the first port 9a is switched through to the second port 9b.

The pressure regulator valve unit 10 has a single-acting 2/2-way valve that is switched by means of a pneumatic actuator from an unactuated state into an actuated state and by means of a return spring back into the unactuated state. In the unactuated state, the first port 10a and the second port 10b are blocked. In the actuated state, the first port 10a is switched through to the second port 10b.

In alternative embodiments, on the one hand valve units are used which are actuated pneumatically rather than electrically, on the other hand 5/2-way valves or 4/2-way valves can also be used, for example, rather than 3/2-way valves or 2/2-way valves, provided the basic functions of switching-through and blocking are allowed. In addition, double-acting valves can also be used as an alternative which are then not reset by means of a spring force but by electrical or pneumatic signals.

In a further alternative embodiment, no connection line 4 is provided, but the second air dryer port 3b, the first check valve port 5a, and the first port 11a of the check valve for regeneration 11 are directly connected to one another.

In further alternative embodiments, not all components are absolutely necessary, insofar as their function is assumed by other components.

During operation, a filling operation, power-saving operation or regeneration operation are performed by the compressed-air treatment system 1, as required.

During filling operation, the compressor is actuated to carry out a compressed air supply and the air is fed via the supply line 2, the air dryer 3, the connection line 4, the first check valve 5, and the outlet line 6 to a vehicle compressed air system.

During power-saving operation, the compressor is actuated to stop the compressed air supply, so that no air flows from the compressor to the compressed-air treatment system 1, while a pressure is maintained in the supply line 2.

During regeneration operation, the compressor is actuated to stop the compressed air supply and the air for regeneration flows from the outlet line 6 via the first valve unit 8 and the second valve unit 9 to the control port 10s of the pressure regulator valve unit 10, as a result of which the first port 10a of the pressure regulator valve unit 10 and the second port 10b of the pressure regulator valve unit 10 are connected to one another. The air from the outlet line 6 therefore flows via the first valve unit 8 and through the regeneration line 12 via the check valve for regeneration 11 and via the connection line 4 through the air dryer 3 via the pressure regulator valve unit 10 into the surrounding area 13.

All features represented in the description, the following claims, and the drawing may be essential to the invention, both individually and also in any combination with one another.

LIST OF REFERENCE NUMBERS 1 compressed-air treatment system
2 supply line
3 air dryer
3a first air dryer port
3b second air dryer port
4 connection line
5 first check valve
5a first check valve port
5b second check valve port
6 outlet line
7 control line
8 first valve unit
8a first port of the first valve unit
8b second port of the first valve unit
8c third port of the first valve unit
9 second valve unit
9a first port of the second valve unit
9b second port of the second valve unit
10 pressure regulator valve unit
10a first port of the pressure regulator valve unit
10b second port of the pressure regulator valve unit
10s control port of the pressure regulator valve unit
11 check valve for regeneration
11a first port of the check valve for regeneration
11b second port of the check valve for regeneration
12 regeneration line
13 surrounding area

What is claimed is:

1. A compressed-air treatment system, comprising
a first valve unit configured to selectively apply pressure to a compressor control line;
a second valve unit;
a pressure regulator valve unit, the pressure regulator valve unit including a control port connectable to the second valve unit;
a supply line connectable to a compressor;
an air dryer having a first air dryer port connected to the supply line and a second air dryer port;
a connection line connectable to the second air dryer port,
a first check valve having a first check valve port connected to the connection line and a second check valve port; and
an outlet line connected to the second check valve port,
a regeneration line including a regeneration check valve directly connectable to the control line,
wherein
the pressure regulator valve unit is configured to relieve pressure in the supply line,
the compressed-air treatment system is configured to release leakage air to a surrounding area via the first valve unit from the regeneration check valve during a compressed-air treatment system filling operation,
the first check valve is open when there is an air flow from the connection line via the first check valve to the outlet line,
the first valve unit is configured to selectively connect a first port or a second port of the first valve unit to a third port of the first valve unit, the first port of the first valve unit being connected to the outlet line, the second port of the first valve unit being connected to the surrounding area, and the third port of the first valve unit being connected to the control line, the second valve unit is configured to selectively open or close a connection between a first port of the second valve unit and a second port of the second valve unit, the pressure regulator valve unit is configured to open or close a connection between a first port of the pressure regulator valve unit and a second port of the pressure regulator valve unit, the first port of the second valve unit is connected to the control line and the third port of the first valve unit, the second port of the second valve unit is connected to the control port of the pressure regulator valve unit, and the third port of the first valve unit is connectable to the control port of the pressure regulator valve unit, the first port of the pressure regulator valve unit is connected to the supply line and the second port of the pressure regulator valve unit is connected to the surrounding area, the regeneration check valve has a first port connected to the connection line and a second port connected to the third port of the first valve unit, and the regeneration check valve is configured to open when there is an air flow from the third port of the first valve unit via the regeneration check valve to the connection line.

2. The compressed-air treatment system as claimed in claim 1, wherein the compressed-air treatment system is configured to perform at least one of
the filling operation, in which air flows from the supply line through the air dryer, the connection line, and the first check valve to the outlet line,
a power-saving operation, in which air flows from the outlet line via the first valve unit to the control line, and
a regeneration operation, in which air flows from the outlet line via the first valve unit and the second valve unit to the control port of the pressure regulator valve unit to cause the first port and the second port of the pressure regulator valve unit to be connected to one another and thereby cause air flow from the outlet line into the surrounding area via the first valve unit, the regeneration check valve, the connection line, the air dryer and the pressure regulator valve unit.

3. The compressed-air treatment system as claimed in claim 2, wherein
the first valve unit has a 3/2-way valve.

4. The compressed-air treatment system as claimed in claim 3, wherein
the second valve unit has a 2/2-way valve.

5. The compressed-air treatment system as claimed in claim 4, wherein
the pressure regulator valve unit has a 2/2-way valve.

6. A method for operating a compressed-air treatment system, the compressed-air treatment system including
a first valve unit configured to selectively apply pressure to a compressor control line;
a second valve unit;
a pressure regulator valve unit, the pressure regulator valve unit including a control port connectable to the second valve unit;

a regeneration line including a regeneration check valve directly connectable to the control line,
a supply line connectable to the compressor;
an air dryer having a first air dryer port connected to the supply line and a second air dryer port;
a connection line connectable to the second air dryer port,
a first check valve having a first check valve port connected to the connection line and a second check valve port; and
an outlet line connected to the second check valve port, wherein
the pressure regulator valve unit is configured to relieve pressure in the supply line,
the compressed-air treatment system is configured to release leakage air to a surrounding area via the first valve unit from the regeneration check valve during a compressed-air treatment system filling operation,
the first check valve is open when there is an air flow from the connection line via the first check valve to the outlet line,
the first valve unit is configured to selectively connect a first port or a second port of the first valve unit to a third port of the first valve unit, the first port of the first valve unit being connected to the outlet line, the second port of the first valve unit being connected to a surrounding area, and the third port of the first valve unit being connected to the control line,
the second valve unit is configured to selectively open or close a connection between a first port of the second valve unit and a second port of the second valve unit,
the pressure regulator valve unit is configured to open or close a connection between a first port of the pressure regulator valve unit and a second port of the pressure regulator valve unit,
the first port of the second valve unit is connected to the control line and the third port of the first valve unit, the second port of the second valve unit is connected to the control port of the pressure regulator valve unit, and the third port of the first valve unit is connectable to the control port of the pressure regulator valve unit,
the first port of the pressure regulator valve unit is connected to the supply line and the second port of the pressure regulator valve unit is connected to the surrounding area,
the regeneration check valve has a first port connected to the connection line and a second port connected to the third port of the first valve unit, and
the regeneration check valve is configured to open when there is an air flow from the third port of the first valve unit via the regeneration check valve to the connection line,
the method comprising the act of:
performing with the compressed-air treatment system by at least one of:
the filling operation in which the compressor is actuated to supply compressed air to a vehicle compressed air system via the supply line, the air dryer, the connection line, the first check valve and the outlet line;
a power-saving operation in which the compressor is actuated to stop the compressed air supply while a pressure is maintained in the supply line; and
a regeneration operation in which the compressor is actuated to stop the compressed air supply and the first valve unit and the second valve unit are actuated such that air flows from the outlet line the control port of the pressure regulator valve unit via the first valve unit and the second valve unit to cause the first port and the second port of the pressure regulator valve unit are connected to one another so that air flows from the outlet line into the surrounding area via the first valve unit, the regeneration check valve, the connection line, the air dryer and the pressure regulator valve unit.

\* \* \* \* \*